Figures 1, 2:
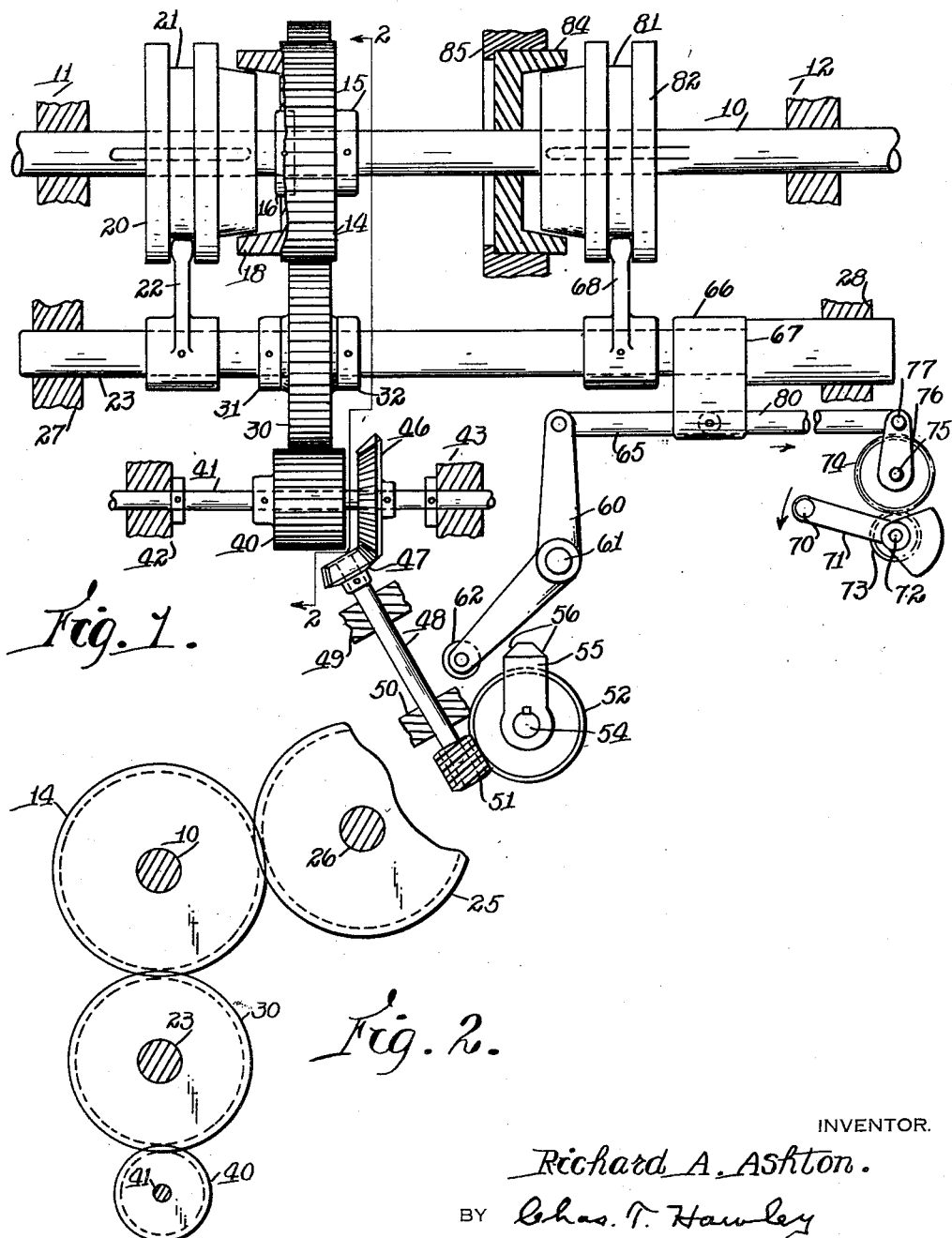

Jan. 2, 1951 R. A. ASHTON 2,536,588
POWER-DRIVEN CLUTCH-ENGAGING MECHANISM
Filed March 24, 1948

INVENTOR.
Richard A. Ashton.
BY Chas. T. Hawley
ATTORNEY

Patented Jan. 2, 1951

2,536,588

UNITED STATES PATENT OFFICE 2,536,588

POWER-DRIVEN CLUTCH-ENGAGING MECHANISM

Richard A. Ashton, Seneca Falls, N. Y., assignor to Seneca Falls Machine Company, Seneca Falls, N. Y., a corporation of Massachusetts Application March 24, 1948, Serial No. 16,675

1 Claim. (Cl. 192—32)

This invention relates to machine tools such as lathes or grinding machines which require frequent engagement and disengagement of a driving clutch. Such frequent clutch operation may become quite burdensome when performed manually at frequent intervals, and particularly so in large machines operating under heavy loads.

It is the general object of this invention to provide clutch-engaging mechanism in which the engagement is manually initiated but is completed under power. In this way the strength of the operator is conserved and undue fatigue is avoided.

My invention further relates to arrangements and combinations of parts which will be hereinafter described and more particularly pointed out in the appended claim.

A preferred form of the invention is shown in the drawings, in which

Fig. 1 is a front elevation of clutch-engaging mechanism embodying my invention and with certain parts shown in section; and Fig. 2 is a sectional end elevation, taken along the line 2—2 in Fig. 1 and showing the relation of certain gears.

Referring to the drawings, I have shown a drive shaft 10 mounted in bearings 11 and 12 and continuously rotated from any convenient source of power not shown.

A clutch gear 14 is freely rotatable on the shaft 10 between collars 15 and 16 and has a clutch sleeve 18 formed thereon. A clutch collar 20 is keyed to the driving shaft 10 but is slidable thereon to engage the clutch sleeve 18. The collar 20 is grooved at 21 to receive the end of a clutch-shifting arm 22 which is mounted on a shift rod 23.

The gear 14 engages a gear 25 (Fig. 2) mounted on and secured to a shaft 26 which constitutes the operating or main shaft of the machine.

The shift rod 23 is freely slidable axially in bearings 27 and 28 and a gear 30 is freely rotatable on the rod 23 between collars 31 and 32 and engages the clutch gear 14.

The gear 30 also engages a gear 40 mounted on and rotatable with a shaft 41 supported in bearings 42 and 43. A bevel gear 46 is mounted on the shaft 41 and engages a bevel pinion 47 on a worm shaft 48, which is rotatable in bearings 49 and 50. A worm 51 on the shaft 48 engages a worm gear 52 which is mounted on and secured to a cam shaft 54.

An arm 55 is secured to the cam shaft 54 and is provided with oppositely inclined cam faces 56. A bell crank 60 is mounted on a fixed pivot 61 and is provided with a cam roll 62 positioned for engagement by one or the other of the cam faces 56 as the arm 55 is rotated. The bell crank 60 is connected by a link 65 to a block 66 slidable on the rod 23 between a shoulder 67 on the rod and a brake arm 68 fixed to the rod 23.

A handle 70 is provided on an arm 71 which is secured to a shaft 72 on which a gear 73 is mounted. The gear 73 engages a larger gear 74 on a shaft 75 which is provided with an arm 76 having a crankpin 77. The pin 77 is connected by a link 80 to the sliding block 66 previously described.

The brake arm 68 extends into a groove 81 in a brake collar 82 adapted to engage a brake sleeve 84 fixed in a suitable support 85.

Having described certain mechanism illustrating my invention somewhat diagrammatically, the operation thereof is as follows:

Assume that it is desired to engage the clutch 20 with the clutch sleeve 18 to rotate the gears 14 and 25 and to thus revolve the operating shaft 26. The handle 70 is pressed lightly downward, thus partially rotating the gears 73 and 74 and moving the link 80 and block 66 to the right in Fig. 1. The block 66 engages the shoulder 67 on the rod 23 and acts through the shifting arms 22 and 68 to engage the clutch collar 20 and to disengage the brake collar 82.

Slight engagement of the clutch collar 20 with the clutch sleeve 18 will start the clutch gear 14 in slow rotation, and this motion will be communicated through the gears 30 and 40, the bevel gear 46 and bevel pinion 47, the worm 51 and the worm wheel 52 to the cam shaft 54 which will thereupon start to rotate.

As soon as the cam roll 62 is engaged by one of the cam surfaces 56, the cam roll will be pushed outward and will act through the bell crank 60 and link 65 to force the block 66 further to the right and to thus firmly engage the driving clutch 20 with the clutch sleeve 18.

The operator is thus required to apply only the relatively slight force necessary for such preliminary engagement of the clutch 20 as will cause the gear 14 to be slowly rotated. This slow rotation is sufficient to rotate the cam arm 55 through the described gear chain and to thus engage one of the cam faces 56 with the cam roll 62. Such engagement provides power to more fully engage the driving clutch 20.

The provision of two oppositely inclined cam faces 56 makes the power-operated clutch-engaging mechanism operative without regard to the direction of rotation of the cam shaft 54, so that the engaging mechanism is equally operative with either direction of rotation of the driving shaft 10.

When it is desired to stop the rotation of the main shaft 36, the handle 70 is pulled upward, thus shifting the block 66 to the left to engage the hub of the shift arm 68. This causes the clutch 20 to be disengaged and the brake collar 82 to be moved into engagement with the brake sleeve 84.

The provision of lost motion between the shoulder 67 and the hub of the shift arm 68 permits a light blow to be delivered when the block 66 is shifted in either direction. This light blow more easily loosens the engaged clutch collar 20 or brake collar 82.

Having thus described my invention and the advantages thereof, I do not wish to be limited to the details herein disclosed, otherwise than as set forth in the claim, but what I claim is:

In a machine, a drive shaft, a driven shaft, a clutch to connect said shafts, a shift rod for said clutch, manual means to give said shift rod an axial sliding movement to initially engage said clutch and thereby start rotation of said driven shaft, a cam shaft, a worm and gear connection between said driven shaft and said cam shaft for simultaneous rotation of said shafts, a cam arm on said cam shaft, a lever engaged and moved by said cam arm at one point in the rotational travel of said arm, and an operative connection from said lever to said shipper rod, whereby engagement of said lever by said arm effects further axial movement of said shipper rod in the same direction and more firm driving engagement of said clutch.

RICHARD A. ASHTON.

REFERENCES CITED

The following references are of record in the file of this patent:

UNITED STATES PATENTS

| Number | Name | Date |
|---|---|---|
| 329,244 | Walter | Oct. 27, 1885 |
| 764,712 | Credlebaugh et al. | July 12, 1904 |
| 1,330,506 | Wilkin et al. | Feb. 10, 1920 |
| 2,033,224 | Bouser | Mar. 10, 1936 |